Patented Feb. 20, 1923.

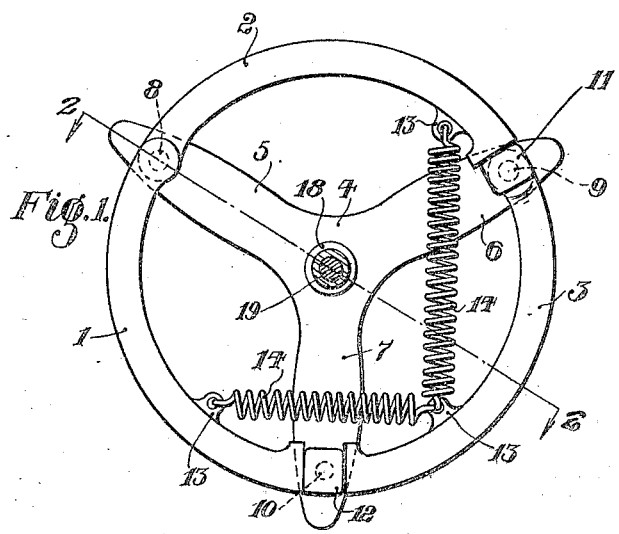
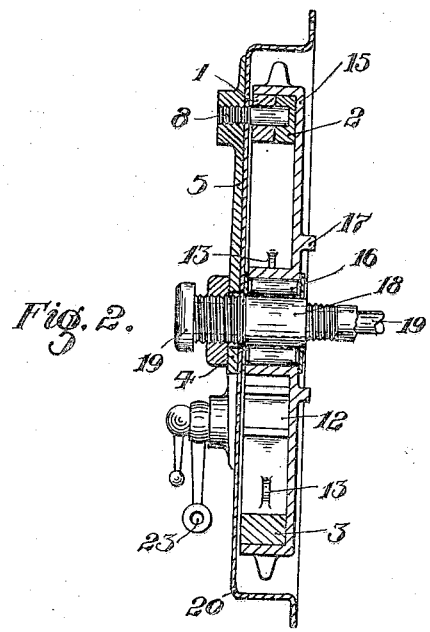

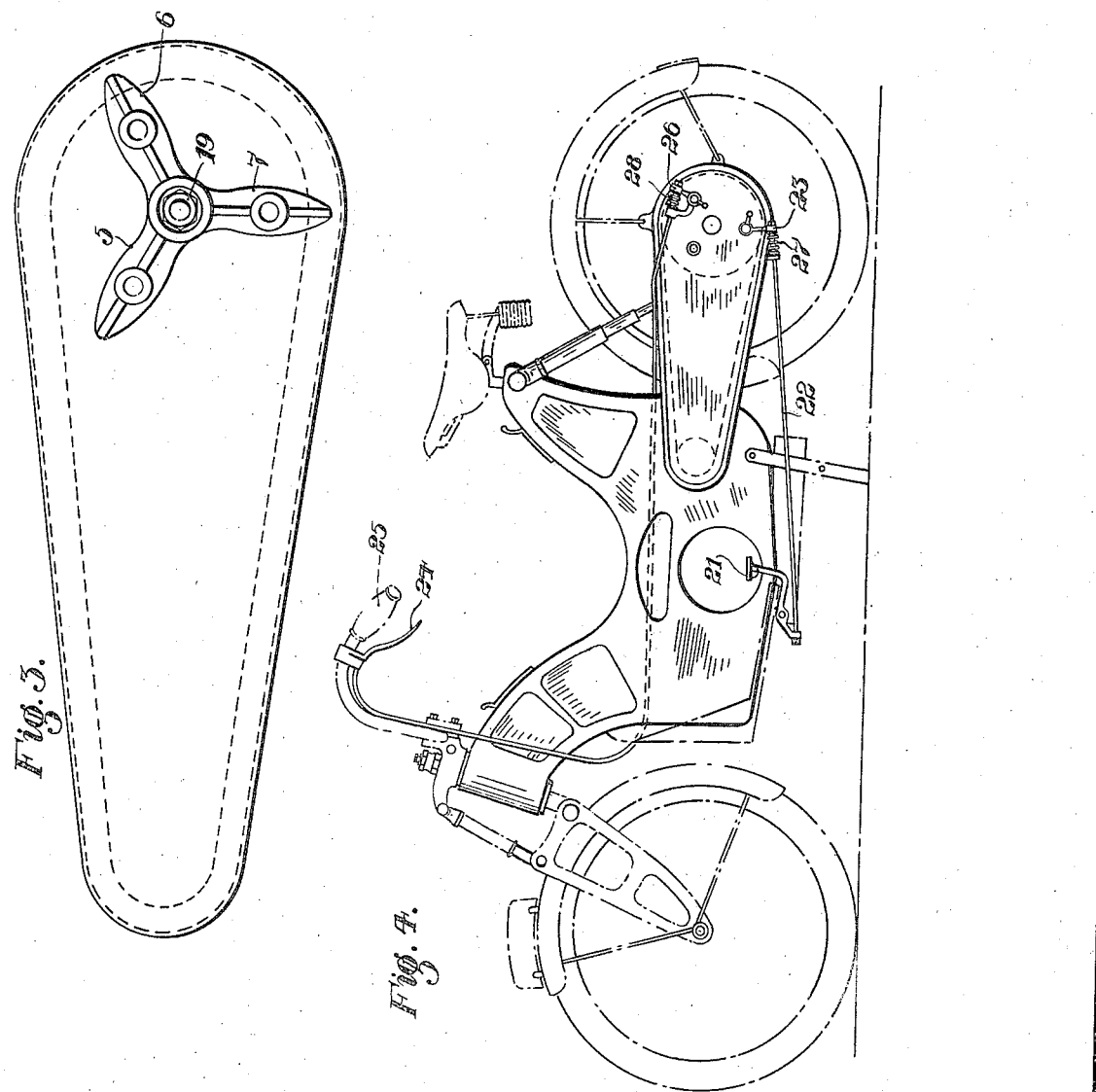

1,446,395

UNITED STATES PATENT OFFICE.

CYRIL GEORGE PULLIN, OF ISLEWORTH, ENGLAND.

BRAKING SYSTEM.

Application filed July 20, 1920. Serial No. 397,569.

*To all whom it may concern:*

Be it known that I, CYRIL GEORGE PULLIN, a subject of the King of Great Britain, residing at Isleworth, Middlesex, England, have invented certain new and useful Improvements in or Relating to Braking Systems, of which the following is a specification.

This invention relates to braking systems, and has particular reference to rotary members such as motor driven velocipede wheels.

Heretofore motor driven velocipedes have been provided with a front and a rear brake each separately controlled, the first by a hand lever usually disposed on the handle bars of the machine, and the latter operable through link connections from a pedal lever. The use of a brake on the front wheel of a motor driven velocipede very often causes a bad skid due to the amount of weight on the front wheel as compared with the load carried on the rear wheel.

Such constructions have usually comprised shoe members impacting against the rim of the wheel and which are connected by a fork member straddling the type and rim at the position at which the shoes are fixed so that the removal of the wheel from the machine is greatly impeded. It is necessary on motor driven velocipedes to have two entirely separate brake controls.

The object of the present invention is to eliminate the necessity of the braking unit on the front wheel, while at the same time providing two separate operable brake control members.

Now according to the present invention I provide a single braking unit comprising an expanding member formed in sections operable by two independent controls, whereby one or more sections may be operated separately, or the whole member simultaneously. By an expanding member, I mean a wheel like member having its rim built up in separate pivoted sections adapted to be moved away from the centre of the wheel member.

In order that my invention may be more clearly understood, I will now describe the same with reference to the accompanying drawings in which Fig. 1 shows a front elevation of the expanding member in relative position with the fixed member; Fig. 2 is a section taken in a plane through the spindle of the rear road wheel of a velocipede as indicated by the line 2—2 of Fig. 1, having a brake system, constructed according to my invention, applied to a driving member of the rear road wheel; Fig. 3 shows a front view of a gear case member of usual construction, but provided with a fixed member in the form of a spider to constitute the supporting means of the pivots of the expanding member, and Fig. 4 is a general elevation of a motor cycle, provided with a dual control brake, constructed according to my invention, and operated by pedal and manual means.

Referring first to Fig. 1, the expanding member is formed by three pivoted segments, 1, 2 and 3 respectively, which are pivotally mounted on a fixed member 4 in the form of a spider with three arms, 5, 6 and 7, each carrying a pivot centre indicated by the reference numerals 8, 9 and 10 respectively. The segmental members 1 and 2 are mounted on a common centre 8, and in order to provide a plane surface round the expanding member, the ends of the segmental members, mounted on the pivot 8 are rabbeted, as will be clearly understood, with reference to Fig. 2. The segmental member 3 is mounted on the pivot centre 9, and is also rabbeted at its hinged extremity, in order to provide space for a cam member 11, also mounted on the pivot centre 9, and so disposed at the face of the cam, so as to not protrude beyond a similar face of the segmental members 2 and 3, while the pivot centre 10 is mounted for rotation, the cam member 12 is mounted similar to the cam 11.

In the construction shown in Fig. 1, it will be seen, that the free end of each segmental member is juxtaposed against a cam; in the one case, a segment 2 abuts against a cam 11 and in the other case, the segmental members 1 and 3 abut against a cam member 12. Further, this normal position is maintained by interconnecting the said free ends by resilient means, such as lugs 13 and springs 14.

It will be seen then, that on the rotation of the cam member 11, the segment 2 will be moved away from the centre of the expanding member, and on the rotation of the cam 12, both the segments 1 and 3, will be moved outwardly about their pivots, and further, that one or a pair of the segmental members may be operated separately, or all three segments may be moved outwardly simultaneously.

Considering now Fig. 2, in which the construction is applied to a sprocket wheel 15 of a rear road wheel of a velocipede, the sprocket wheel is mounted on suitable bearings, such as 16 provided with driving dogs 17, for inter-engagement with the hub of the road wheel and co-axially mounted on a sleeve member 18 through which is projected a spindle 19 of the rear road wheel.

In the construction shown, a sleeve member 18 is carried by a chain guard 20 of ordinary construction, and to a threaded extremity of the sleeve member 18, protruding through the chain guard 20, is secured a fixed member 4 carrying the pivot centres 8, 9 and 10. A mud guard as before stated is shown with the attachment 4 in Fig. 3.

In the application of the invention to a motor cycle, it is desired that one control shall be by a foot pedal and the other by a hand lever; I prefer that the foot lever shall operate the two segments of the hand lever to cause the rotation of the cam, moving only one segment of the expanding member. Accordingly, the foot lever 21 (Fig. 4) is connected by rods 22 to a lever connection 23 shown in Figs. 2 and 4, which in turn, is fixed to the cam 12, so that as the pedal 21 is depressed, the cam 12 is rotated, thereby moving out the segments 1 and 3 into engagement with the inner rim face of the sprocket 15 in such a manner, that if the sprocket is rotated, it will be braked by the frictional contact of the segmental members with the rim. The hand lever 24 is connected by any known arrangement, for instance, Bowden cable, indicated at 25, for operating the lever 26 (Fig. 4) so that as the lever 24 is pulled towards the grip 25 on the handle bar of the machine, the cam 11 is rotated to effect the outward movement of the segmental member 2, into contact with the inner face of the rim of the sprocket 15. In both cases the levers 23 and 26 are returned to their normal position, after operation, by suitable spring members, such as 27 and 28.

In the preferred form of my invention, the expanding member comprises a plurality of similar arcuate sections each pivoted equidistant from their common describing centre. The number of sections will depend on the particular design required, but in the present case, I will describe the use of an expanding member comprising three sections. The pivots for the sections may be supported in a spider member having as many arms as there are sections. Two sections will be pivoted on a common axis on one arm of the spider, while the other is pivoted on another arm. When three sections are used, one section may be operable by the hand brake mechanism, while the two others may be operable simultaneously by the pedal brake mechanism, and further the hand brake and the pedal brake may be operated simultaneously to move all three sections away from their describing centre. The means for obtaining the required movement of the sections may be provided by the use of a rotatable member, such as a cam, disposed adjacent the end of each section away from its pivot. The hand brake mechanism if only operating one section may have its cam pivoted on an arm of the spider and so shaped that when rotated, it causes a forcing out preferably against a spring member, of the respective section, while the pedal lever may be caused to rotate a single cam also pivoted on an arm of the spider and disposed between the free ends of the two adjacent sections which are operable simultaneously by the pedal lever. These two sections may be connected by a spring member and one of them may also be connected to the section operated by the hand brake lever, the springs acting to normally maintain the sections in contact with their respective cams and maintain them in the position defined by a circle described from their common centre and having a radius equal to the radius of the wheel like expanding member of which they normally form a part of the sectional rim.

In the application of my invention to the rear road wheel of a motor driven velocipede, I prefer to dispose the braking unit within the sprocket wheel, which may preferably be formed as a disc wheel, having the disc on one side of its hub and its rim comprising the teeth disposed on the bearing of the rear wheel, and to complete the structure, a chain case may be so fitted, as to totally enclose, in combination with the sprocket wheel, the sections of the braking unit.

In the preferred construction of my invention, the sections and the cams are so arranged that they form an even surface on each side, and this may be obtained by cutting away a portion of the end of the sections at their pivoted extremities in order that each adjacent section may overlap, or to provide the required movement of the cam, as the case may be.

It will be understood, that a spider member, instead of being mounted on the sleeve 18, may be fixed to or formed integrally with the chain case, either inside or outside; in either case provided with apertures through the case or the rim, or both, as the case may be, to receive the three pivot centres.

I claim:

1. In a braking device, the combination with a rotatable member, having an annular friction face, of a fixed member, pivot centres on said fixed member and adjacent to said friction face, a pair of segmental members, each mounted on a pivot centre, and having the pivot portions of said segments in juxtaposition, a further segmental member mounted on another pivot centre disposed away from said pivot portions, means for effecting the movement of two segmental members on distant pivot centres towards said annular friction face, and separate, independent means for effecting separate or similar simultaneous movement in the other segment for the purpose of braking said annular friction face.

2. In a braking device, the combination with a rotatable member having an annular friction face formed thereon, a fixed member, three pivot centres on said fixed member, a pair of segmental members mounted on one of said pivot centres, a third segmental member, and a rotatable cam member mounted on the second pivot centre, said cam member being in contact with the free end of one of said pair of segmental members, a second rotatable cam member mounted on the third said pivot centre, and disposed between and in contact with the free end of the other of said pair of segmental members and the free end of the third segmental member, and means for resiliently maintaining said free ends in contact with said cam members and independent means for separately rotating said cams simultaneously or separately to effect the movement of said segmental members about their pivots and towards said annular face for the purpose of braking said annular friction face.

3. In a braking device, the combination with a sprocket wheel of the rear road wheel of a velocipede, of an inner flat face formed on the rim of said sprocket wheel, a fixed member, three pivot centres on said fixed member, a pair of segmental members mounted on one of said pivot centres, a third segmental member and a rotatable cam member mounted on the second pivot centre, said cam member being in contact with the free end of one of said pair of segmental members, a second rotatable cam member mounted on the third said pivot centre and disposed between and in contact with the free end of the other said pair of segmental members and the free end of the third segmental member, and means for resiliently maintaining said free ends in contact with said cam members and independent means for separately rotating said cams simultaneously or separately to effect the movement of said segmental members about their pivots and towards said annular face for the purpose of braking said sprocket wheel.

4. In a braking device, the combination with a sprocket wheel of the rear road wheel of a velocipede, of an annular friction face formed on the inner side of the rim of said sprocket wheel, a gear case, a three armed fitting fixed on said gear case, a pivot centre on each arm of said fitting, a pair of segmental members mounted on one of said pivot centres, a third segmental member, and a rotatable cam member mounted on the second pivot centre, said cam member being in contact with the free end of one of said pair of segmental members, a second rotatable cam member mounted on the third said pivot centre, and disposed between and in contact with the free end of the other of said pair of segmental members, and the free end of the third segmental member, means for resiliently maintaining said free ends in contact with said cam members, and independent means for separately rotating said cams simultaneously or separately to effect the movement of said segmental members about their pivots and towards said annular friction face for the purpose of braking said sprocket wheel.

5. In a braking device, the combination with a sprocket wheel of the rear road wheel of a velocipede, an inner flat face formed on the rim of said sprocket wheel, a gear case, a three armed fitting fixed on said gear case, a pivot centre on each arm of said fitting, a pair of segmental members mounted on one of said pivot centres, a third segmental member, and a rotatable cam member mounted on the second pivot centre, said cam member being in contact with the free end of one of said pair of segmental members, a second rotatable cam member mounted on the third said pivot centre, and disposed between and in contact with the free end of the other of said pair of segmental members and the free end of the third segmental member, a lug near the free end of each said segmental member, tension springs interconnecting said lugs so that the free ends of the segmental members are maintained in contact with said cam members, and separate independent means for separately rotating each of said cams, simultaneously or separately to effect the movement of said segmental members, about their pivots and towards said annular face for the purpose of braking said sprocket wheel.

6. In a braking device, the combination with a sprocket wheel of the rear road wheel of a motor driven velocipede, of an annular friction flat face formed on the inner side of the rim of said sprocket wheel, a gear case, a three armed fitting fixed on said gear case, a pivot centre on each arm of said fitting, a pair of segmental members mounted on one of said pivot centres, a third segmental member, and a rotatable cam member mounted on the second pivot centre, said cam member being in contact with the free end of one of said pair of segmental members, a second rotatable cam member mounted on the third said pivot centre and disposed between and in contact with the free end of the other of said pair of segmental members, and the free end of the third segmental member, means for resiliently maintaining said free ends in contact with said cam members, manual means for rotating the cam on the said second pivot centre and pedal means for rotating the cam on the said third pivot centre, whereby the cams may be operated separately or simultaneously to effect the movement of said segmental members about their pivots and towards said annular friction face for the purpose of braking said sprocket wheel.

In testimony whereof I affix my signature.

CYRIL GEORGE PULLIN.